April 22, 1947.  R. RUEGG  2,419,463
FURNACE HAVING SEQUENTIALLY ARRANGED GAS HEATING TUBES
Filed March 31, 1944
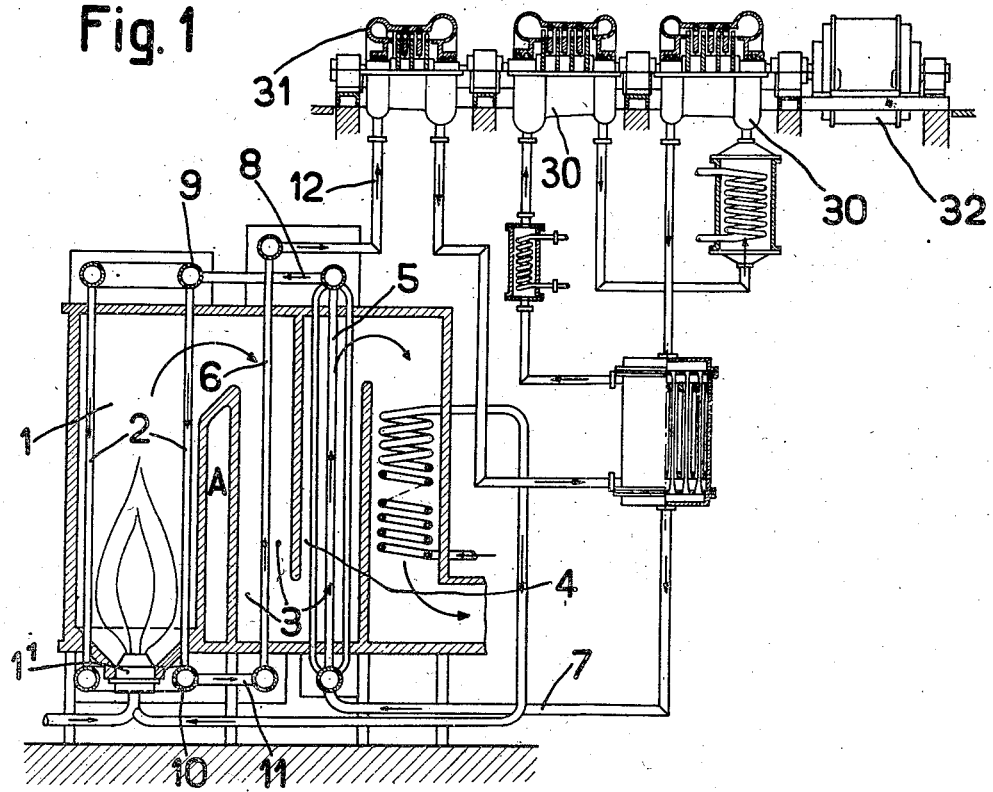
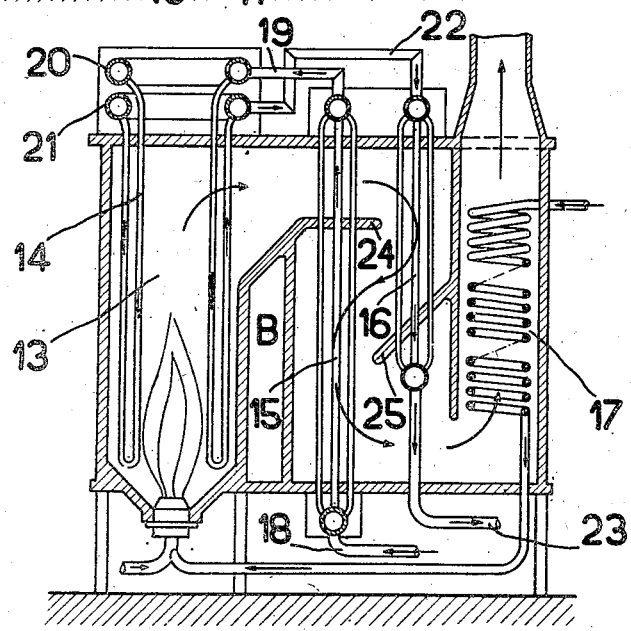
Inventor
Rudolf Ruegg
By Dodge
Attorneys Patented Apr. 22, 1947

2,419,463

UNITED STATES PATENT OFFICE 2,419,463

FURNACE HAVING SEQUENTIALLY ARRANGED GAS HEATING TUBES

Rudolf Ruegg, Zurich, Switzerland, assignor to Aktiengesellschaft Fuer Technische Studien, Zurich, Switzerland, a corporation of Switzerland Application March 31, 1944, Serial No. 528,982
In Switzerland May 19, 1943

4 Claims. (Cl. 126—109)

This invention relates to a gas heater comprising a heating system arranged in a combustion chamber and at least two further heating systems designed for contact heating and arranged beyond said combustion chamber, the gas heater being intended more particularly for thermal power plants, in which at least the greater part of a gaseous working medium describes a circuit and has to be heated by a supply of heat from an external source.

The chief object of the invention is to provide, in a gas heater of the kind herein described, for the best possible utilization of the heat contained in the flue gases and thus improve the economical working of the gas heater. A further object of the invention is to improve the reliability in operation, especially as regards the heating system arranged in the combustion chamber. In order to realize the foregoing objects in a gas heater of the kind referred to, according to the present invention the gas to be heated traverses, in the first instance, that heating system of the different heating systems heated by contact, the major portion of which is contacted by the part of the products of combustion having the lowest temperature. Hereafter the gas to be heated flows into the heating system arranged in the combustion chamber and finally into the second of said systems heated by contact, wherein it is raised to its final temperature.

The accompanying drawing shows, by way of example and in a simplified mode of representation, two preferred embodiments of gas heaters according to the invention. In this drawing:

Fig. 1 shows a gas heater in which the heating system through which the gas to be heated first passes is arranged entirely within the range of the lowest flue gas temperatures to which are exposed the heating systems traversed by the gas to be heated.

Fig. 2 shows a gas heater in which the upper part of the heating system through which the gas to be heated first passes is exposed to high flue gas temperatures, whereas the lower section of this system is exposed to the lowest flue gas temperatures acting upon the heating systems traversed by the gas to be heated.

In Fig. 1 the numeral 1 denotes the combustion chamber of a heater A comprising a burner 1¹ and operating in conjunction with a thermal power plant in which air serving as working medium describes a circuit and is brought to a higher pressure in a two-casing compressor 30, then heated indirectly in the heater A by a supply of heat from an external source and thereupon expanded in a turbine 31 giving up power both to the compressor 30 as also to a consumer 32 of useful output. The combustion chamber 1 is lined with tubes 2 forming a heating system for the air of the cycle, which has to be brought to a higher temperature. The tubes 2 comprise the main heater and are subject to radiant heat from the burner flame. The numerals 3 and 4 denote two flues arranged beyond the combustion chamber 1 and connected in series. In the flue 4 a primary surface heat exchange system 5 is arranged and in the flue 3 a secondary surface heat exchange system 6. The heating systems 5 and 6 are chiefly heated by contact, and it is important to observe that the heating system 5 is subject to the lowest flue gas temperatures to which are exposed the heating systems traversed by the working medium to be heated.

The air to be heated passes through a pipe 7 first into the heating system 5 and then through a pipe 8 into the annular-shaped distributor 9, to which the tubes 2 arranged in the combustion chamber 1 are connected. The air which is heated to a further degree in said tubes 2 then passes through an annular-shaped collector 10 and a pipe 11 into the heating system 6, where it is raised to the required final temperature, subsequently passing out of the heater A through a pipe 12 into the turbine 31. The air to be heated flows through the heating system 5 in concurrent flow relation to the flue gases, whereas in heating systems 2 and 6 it chiefly flows as a countercurrent to the combustion and flue gases respectively.

Since in the heater A the coldest air first flows through the heating system 5 which is last swept by the flue gases, it can be ensured that the flue gases are cooled down to a relatively low temperature in the heating system 5, so that the heat contained therein is utilized to the greatest possible extent for heating the air passing through the above described circuit. In spite of this, the air preheated in heating system 5 still has a sufficiently low temperature to enable it to carry off a large amount of the heat exchanged through the tubes 2 which are exposed to the heat radiating in the combustion chamber 1 and which are consequently the most endangered parts. This is very important for the reliable service of the heating system constituted by the tubes 2.

The heater B shown in Fig. 2 likewise comprises a combustion chamber 13, in which tubes 14 of a heating system are arranged. Two surface heat exchange systems 15 and 16 are provided beyond the combustion chamber 13. The flue gases issuing from the combustion chamber 13 first sweep, chiefly as a cross current, over the upper part of the heating system 15, thereafter over the upper, larger part of the heating system 16 and then over the lower part of the heating system 15 which is separated from the upper section by a wall 24. The portion of heat exchange system 15 above wall 24 and the tubes 14 comprise the main heater. Passing from the lower portion of exchange system 15 which is the primary exchanger the flue gases sweep over the lowermost part of the heating system 16 which is separated from the upper part of said system 16 by a wall 25. The heating system 16, in which the air to be heated is raised to its final temperature, is thus placed, with regard to the flow of the flue gases, chiefly between the upper, hot section of the system 15 swept by the flue gases at right-angles to its axis, and the lower, colder section of said system 15, which is separated from its upper section by means of the partition wall 24. Finally the flue gases pass through a preheater 17 for the combustion air.

The lowermost section of the heating system 15 is, in this case also, subjected to the lowest flue gas temperatures to which are exposed the heating systems 14, 15, 16 traversed by the air to be heated. The latter is supplied through a pipe 18 and passes at the bottom of heater B into the heating system 15. It flows out of this system 15 at its upper end and passes afterwards through a pipe 19 into a distributor 20 from which it reaches the tubes 14. The air which has been further heated in the tubes 14 by radiation heat transmitted from the flame in the combustion chamber 13 passes into a collector 21, which is connected by a pipe 22 to the heating system 16. In the latter the air is raised to the required final temperature, whereafter it flows off at the bottom of the heater through a pipe 23 into the turbine of the power plant. The embodiment of the invention shown in Fig. 2 offers the further advantage that any ash particles which may be entrained by the flue gases issuing from the combustion chamber 13 are precipitated on that part of the heating system 15 which is still relatively cold.

The invention resides in the gas heater, but the problem solved by the invention is inherent in any heater in which the entering gas to be heated has a relatively high temperature and the heat to be recovered from the off-flowing combustion products must be high. These are inevitable conditions in a power plant of the type described.

The invention contemplates a main heater at least the major portion of which is in the combustion chamber and to which the heat transfer is largely by radiant heat. In Fig. 1 this heater is indicated at 2. In Fig. 2 the main heater comprises the tubes 14 and also those parts of the tubes 15 which are above the wall 24. In each embodiment there are two surface heat exchangers which derive heat from the off-flowing products of combustion, one of which heats gaseous medium flowing to the main heater, and the other of which further heats gaseous medium flowing from the main heater. In Fig. 1 the first surface heater is indicated at 5 and the second at 6. In Fig. 2 the first surface heater is that portion of 15 which is below the wall 24 and the second is the surface heat exchanger 16. In both the arrangements illustrated the exchanger which heats the gaseous medium flowing to the main heater is subjected to the coolest products of combustion, whereas the gaseous medium flowing from the main heater exchanges heat with products of combustion which have been cooled little, if at all, and are therefore at a much higher temperature.

The advantage offered by the invention is, that with the same surface in the heat exchangers, and with the same quantity of heat to be given up to the gaseous medium being heated, and assuming the same heat transmission coefficients, the gaseous products of combustion are cooled to a greater extent than was possible hitherto, and therefore enter the combustion air preheater at a correspondingly lower temperature.

While the gaseous medium enters the main heater at a higher temperature, the temperatures of the main heater are kept within tolerable limits. The overall effect is more economical performance and a saving in the cost of construction.

Assuming the heat exchanging surface of the combustion air pre-heater to be of the same size as in the hitherto known designs and provided that the heat transmission coefficients are the same, the products of combustion, when applying the present invention, then issue from this combustion air pre-heater at a lower temperature than hitherto. This brings about as good a utilization as possible of the heat contained in the flue gases, i. e., in the products of combustion, so that the intended purpose is fully realized. If, on the other hand, it is desired that the combustion gases from the combustion air pre-heater of a heater according to the present invention be discharged at the same temperature as from a heater of hitherto known design and assuming that the same conditions as regards the surfaces of the heat exchangers, the quantity of heat to be given up to the gas and the heat transmission coefficients are prevailing in both cases in the heater proper, then the application of the present invention permits of the heat exchanging surfaces of the combustion air pre-heater being executed of smaller dimensions and thus at correspondingly reduced cost, since then the combustion products entering at a lower temperature into the combustion air pre-heater do not have to give up in the latter as much heat.

What is claimed is:

1. A heater for heating gases which are already at relatively high temperatures, comprising in combination, means forming a combustion chamber; a tubular main heat exchanger in said chamber; combustion means in said chamber; a conduit for conducting products of combustion from said chamber to a point of discharge; primary and secondary surface heat exchangers so arranged in said conduit that flowing products of combustion contact at least the major portion of the primary exchanger after contacting at least the major portion of the secondary exchanger; and connections for passing gases to be heated first through the primary exchanger, thereafter through the main exchanger and finally through the secondary exchanger.

2. A heater for heating gases which are already at relatively high temperatures, comprising in combination, means forming a combustion chamber; a tubular main heat exchanger in said chamber; combustion means in said chamber; a conduit for conducting products of combustion from said chamber to a point of discharge; primary and secondary surface heat exchangers so arranged in said conduit that flowing products of combustion contact a minor portion of the primary exchanger at the gas-discharge end thereof, then at least the major portion of the secondary exchanger and then the major portion of the primary exchanger; and connections for passing gases to be heated through the primary exchanger in a direction from the major to the minor portion thereof, then through the main exchanger and finally through the secondary exchanger.

3. A heater for heating gases which are already at relatively high temperatures, comprising in combination, means forming a combustion chamber; a tubular main heat exchanger in said chamber; combustion means in said chamber; a conduit for conducting products of combustion from said chamber to a point of discharge; at least two surface heat exchangers arranged sequentially in said conduit; and connections for passing gas to be heated first through the heat exchanger most remote from the combustion chamber, thereafter through the main exchanger and finally through the heat exchanger less remote from the combustion chamber.

4. A heater for heating gases which are already at relatively high temperatures, comprising in combination, means forming a combustion chamber; a tubular main heat exchanger in said chamber; combustion means in said chamber; a conduit for conducting products of combustion from said chamber to a point of discharge; at least two surface heat exchangers arranged sequentially in said conduit; and connections for passing gas to be heated first through the heat exchanger most remote from the combustion chamber, thereafter through the main exchanger and finally through the heat exchanger less remote from the combustion chamber and in counterflow relation to the products of combustion.

RUDOLF RUEGG.

REFERENCES CITED

The following references are of record in the file of this patent:

UNITED STATES PATENTS

| Number    | Name  | Date          |
|-----------|-------|---------------|
| 2,119,817 | Keller | June 7, 1938  |
| 2,174,663 | Keller | Oct. 3, 1939  |
| 2,224,544 | Keller | Dec. 10, 1940 |